(12) United States Patent
Phang et al.

(10) Patent No.: US 12,129,378 B2
(45) Date of Patent: Oct. 29, 2024

(54) TRIM RESTORATION COMPOSITION

(71) Applicant: Illinois Tool Works Inc.

(72) Inventors: Tze-Lee Phang, Glenview, IL (US); Ali Alwattari, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 348 days.

(21) Appl. No.: 17/096,351

(22) Filed: Nov. 12, 2020

(65) Prior Publication Data

US 2021/0189130 A1    Jun. 24, 2021

Related U.S. Application Data

(60) Provisional application No. 62/949,787, filed on Dec. 18, 2019.

(51) Int. Cl.
| | |
|---|---|
| *C08L 83/06* | (2006.01) |
| *C09D 5/02* | (2006.01) |
| *C09D 5/08* | (2006.01) |
| *C09D 7/63* | (2018.01) |
| *C09D 183/06* | (2006.01) |

(52) U.S. Cl.
CPC ............. *C08L 83/06* (2013.01); *C09D 5/024* (2013.01); *C09D 5/082* (2013.01); *C09D 7/63* (2018.01); *C09D 183/06* (2013.01)

(58) Field of Classification Search
CPC .......... C08L 83/06; C09D 7/63; C09D 5/024; C09D 5/082; C09D 183/06; C09D 183/04; C08G 77/045; C08G 77/18; C08K 5/54

See application file for complete search history.

(56) References Cited

U.S. PATENT DOCUMENTS

| | | | |
|---|---|---|---|
| 2016/0083620 A1* | 3/2016 | Maghsoodi | G02B 1/14 524/588 |
| 2019/0233594 A1* | 8/2019 | Furukawa | A61K 8/90 |
| 2019/0300768 A1* | 10/2019 | Jakob | C09D 183/04 |
| 2021/0095125 A1* | 4/2021 | Henning | C08G 77/18 |

* cited by examiner

*Primary Examiner* — Robert S Jones, Jr.
*Assistant Examiner* — Jiangtian Xu
(74) *Attorney, Agent, or Firm* — MaxGoLaw PLLC

(57) ABSTRACT

A composition is provided that restores and protects substrates to which it is applied including trim and tires on vehicles. The composition forms a high adhesion high cohesion film that protects the underlying substrate from the adverse effects of ultra violet (UV) rays, heat, rain, snow, and other environmental contaminants. A process of applying the same is also provided.

17 Claims, 1 Drawing Sheet

After 6 hours

After 60 days

TRIM RESTORATION COMPOSITION

RELATED APPLICATIONS

This application is a non-provisional application that claims priority benefit of U.S. provisional application Ser. No. 62/949,787 filed 18 Dec. 2019; the contents of which are hereby incorporated by reference.

FIELD OF THE INVENTION

The present invention in general relates to a composition for restoring and maintaining surfaces and a process for the use thereof and in particular, to such a composition amenable to application to a variety of substrates primarily related to vehicle trim and moldings.

BACKGROUND OF THE INVENTION

The modern automobile and other transportation vehicles have an increased amount of exterior trim and moldings made of plastic and rubber based on their unique material properties. These materials, based primarily on polypropylene, provide aesthetics, light weight, corrosion resistance, strength, and flexibility of design. However, these polymers on the exterior of a vehicle, are almost constantly subjected to the adverse effects of ultra violet (UV) rays, heat, rain, snow, and other environmental contaminants. If not properly cared for, the weathering elements will cause the exterior trim and molding to age prematurely (degradation), and the surface of the trim to become dull, faded, and cracked.

Current consumer trim restoration products used to treat and restore faded exterior trim and moldings back to their near-show-room condition use silicone oil (Polydimethylsiloxane (PDMS)) or wax in one of a water-based, solvent-based, or black dye pigment solution. However these consumer based trim restoration formulations do not adhere strongly to the surface to which they are applied, nor do they form a high adhesion high cohesion film. Therefore, these consumer trim restoration formulations fail to endure car wash cycles and eventually wear off from the applied surfaces that the formulations are intended to protect.

In the professional original equipment manufacturer (OEM) market, available trim restoration products utilize reactive chemistry to form a durable coating. However, these professional trim restoration products are very costly both chemically and in terms of required capital equipment. Current professional trim restoration products also require delicate process control to obtain a durable smooth finish. Moreover, these products are mostly toxic or harmful to the user and the environment.

Therefore, attempts to bring professional OEM trim restoration products to the consumer do-it-yourself (DIY) space present many challenges. A first challenge is the creation of a formulation that forms a good coating with no streaking, no bubbling, good leveling properties, etc. that is applied with a simple wipe on application without complicated process control equipment. A second challenge relates to the difficulty of replacing the toxic solvents being used to dissolve the reactive chemistries. Finally, the professional OEM trim restoration products are often harmful to breath.

Thus, there exists a need for a long lasting and durable vehicle trim and molding restoration composition for the consumer market that is easy to apply and is safe for the user and the environment.

SUMMARY OF THE INVENTION

A restorative and protective composition for application to a substrate is provided that includes a silicone silane, a carrier, and an adhesion promoter. The composition leaves a durable film on a substrate when dried.

A process is provided for applying a restorative and protective film to a substrate. The process includes applying the composition that forms the restorative and protective film to the substrate, and removing excess from the surface to form the film. The applying is with a spray or or a liquid poured onto woven or non-woven fabric or sponge, or a soaked wipe.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein:

DETAILED DESCRIPTION OF THE PREFERRED EMBODIMENTS

Figure 1B:
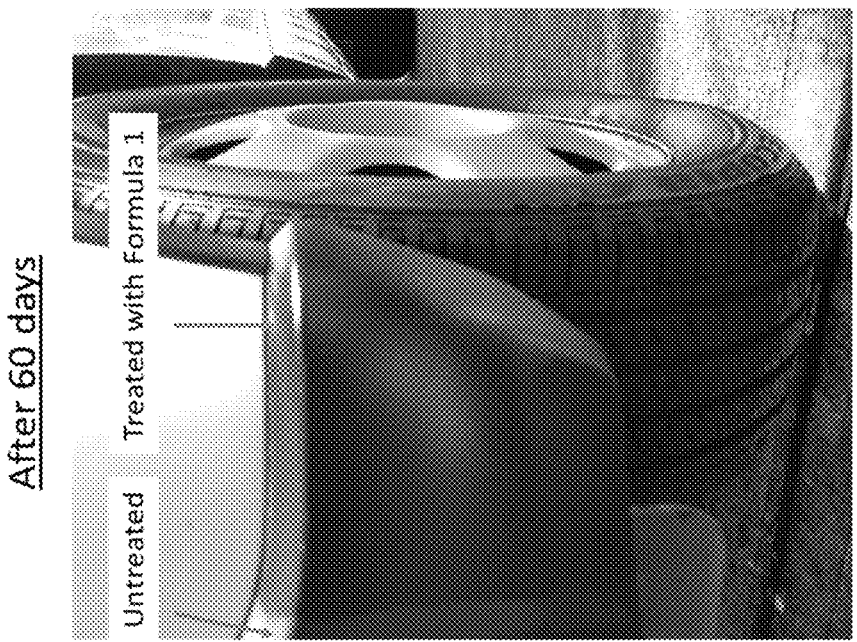
FIGS. 1A and 1B are photographs of a vehicle bumper showing the bumper with an untreated area and a portion of the surface treated with an embodiment of the inventive restorative and protective composition after 6 hours and at 60 days, respectively.

The present invention has utility as a trim and molding restorative and protective composition that forms a coating on a substrate to render the underlying substrate protected from the adverse effects of ultra violet (UV) rays, heat, rain, snow, and other environmental contaminants. The present invention has the attribute of being amenable to application as a wipe-on or spray applied composition that forms a film without resort to the complex deposition processes that characterized prior art systems. Embodiments of the trim and molding restoration composition adhere strongly to the surface to which they are applied, and form a high adhesion high cohesion film. Therefore, embodiments of the trim and molding restoration composition are able to endure car wash cycles and do not wear off rapidly from the applied target surfaces compared to conventional coatings. As a result of the durability of the restorative and protective film imparted to a substrate by the inventive composition, the substrate needs to have protective treatments less often. An inventive composition is also amenable to formulation independent of, and therefore devoid of volatile organic compounds (VOCs).

While the present invention is further detailed with respect to application to vehicle trim and molding such as a bumper cover, if is appreciated that an inventive composition is readily applied to numerous other substrates to impart protective films thereto. To the extent that an inventive composition is described herein with respect to total weight percentage of various components, these amounts are provided independent of propellants that are used in pressurized aerosol packages.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, a coating is defined as a layer of cured material having a thickness of between 0.01 and 1000 microns. As used herein a coating is synonymous with a film.

As used herein, molecular weight with respect to a polymeric material references to average number molecular weight as measured by gel permeation chromatography (GPC).

An inventive composition is provided that provides a long lasting durable trim and molding restoration and protection based on a reactive silicone silane in a non-aqueous carrier to form a stable solution that is both clear and transparent in some inventive embodiments. In some embodiments of the present invention, an adhesion promoter is also present. In still other embodiments, the inventive composition includes a propellant to afford a pressurized aerosol container for dispensing onto a target substrate.

Strong, durable, and lasting shine coating on a target substrate is obtained from an inventive composition. An inventive coating is obtained from the cured reaction product of reactive silicone silanes. Reactive silicone silanes operative in the present invention illustratively include polysilsesquioxanes, silicone MQ resins, and silicone MTQ resins, where M is $(CH_3)_3SiO$, Q is $SiO_4$, and T is $(CH_3)SiO_3$, with the proviso that at least one of M, Q, or T is modified to include a reactive terminal group of methoxy, ethoxy, dialkoyl, or trialkoxyl types. The reactive silicone silanes used in the current invention are cured on the target substrate to form a coating. The silicone silanes are selected to include silanol groups inclusive of hydroxyl moieties that impart solubility in a carrier and are cured on the target substrate for form the inventive coating. As a result, solvation of an components of an inventive rim restoration is simplified compared to higher molecular weight materials that are merely deposited on the target substrate by solvent evaporation. A silicone oil or organic solvent is desirable in reducing volatile organic content (VOC) emissions in forming a coating compared to conventional compositions. Furthermore, curing on the substrate in some inventive embodiments yields coatings that are highly cross-linked and higher molecular weight as compared to solvent dissolved or dispersed pre-cured polymers resulting in greater durability coatings. Typical viscosity range of the neat reactive silicone silanes in the present invention are between 20 and 60,000 cps at 25° C.

The condensation of silanol groups in the formulation achieves the desired cure and results in coatings that are shinny when observed by an unaided normal human eye under sunlight illumination. The resulting coatings are durable compared to conventional tire shine coatings due to a high degree of cure and adhesion to the target substrate. The cure in some inventive embodiments is accelerated by the addition of catalyst to the formulation.

A carrier operative in the present invention dissolves or disperses the silicone silanes that upon cure become the shine agent. Carriers operative herein include silicone oils that include specifically include decamethylpentasiloxane, hexamethylcyclotrisiloxane (D3), octamethylcyclo-tetrasiloxane (D4), decamethylcyclo-pentasiloxane (D5), dodecamethylcyclo-hexasiloxane (D6), hexamethyldisiloxane, combinations thereof, and oligomeric forms that that have viscosities of from 2 to 10,000 centistokes (cSt); $C_4$-$C_{24}$ alkanes, $C_2$-$C_{24}$ alcohols, $C_2$-$C_{24}$ ketones, $C_2$-$C_{24}$ glycols, $C_4$-$C_{24}$ glymes, and combinations thereof; It is appreciated that the inclusion of a surfactant promotes miscibility of reactive silicone silanes in silicone oil and/or hydrocarbon based solvents. In some inventive embodiments, the organic solvent is VOC exempt. As used herein, "VOC" is defined as a compound listed on the United States Environmental Protection Agency Master List of Volatile Organic Compounds circa 2019.

An adhesion promoter is present in some inventive embodiments to promote bonding of the reactive silicone to the trim substrate. It is appreciated that some adhesion promoters operative herein function as a cure promoter for the reactive silicone silane when present at high concentrations. The loading of an adhesion promotor in amounts to promote cure are readily determined by a study of time of cure as a function of concentration. Adhesion promoters operative herein illustratively include N-2-aminoethyl-3-aminopropyltrimethoxysilane, aminopropyltriethoxysilane, $C_2$-$C_{24}$ carboxamides, bis[3-(triethoxysilyl)-propyl]tetrasufide-3-mercapto, 2(diphenylphosphino)ethyl triethoxysilane, N-vinylbenzyl-N-2(trimethoxysilylpropylamino)ethyl silane, trimethoxysilylpropyl-diethylenetriamine, 3-aminopropylmethyldiethoxysilane, 3-(1-aminopropoxy)-3-3-dimethyl-1-propenyl-trimethoxysilane, 1-trimethoxysilyl-2-(m, p-chloromethyl)phenylethane, trimethoxysilylpropyl-substituted polyethylene-imine, and combinations thereof.

To the extent an adhesion promoter or combination of promotors do not cure with a desired speed, a separate cure catalyst for the silanol functional present is provided. Such cure catalysts illustratively including metal carboxylates, metal oxides, alkyl metal carboxylates, alkyl metal alkoxides and metal chelates. Exemplary specific catalysts include tetraalkyl titanate, tetraalkyl zirconate, dibutyltindiacetate, dibutyltindilaurate, dibutyltin dioctoate, dibutyltin dimalate, dibutyltin diacetate, stannous octoate, tin octylate, tetrabutyl titanate, dioctyltindilaurate, tetraisopropyltitanate titanium n-butoxide, zinc acetate, zinc 2-ethylhexanoate, and combinations thereof.

An inventive composition includes a silicone silane which is capable of forming a protective cured coating on a target substrate. An inventive is a storage stable with loadings of the constituents limited in some inventive embodiments to maintain clear and transparent solutions. Transparency is an aesthetic aspect that enhances consumer acceptance of an inventive composition.

An inventive composition in some embodiments also contains a fluorocarbon or hydrocarbon propellant when aerosol delivery is desired. In other embodiments, inventive compositions are applied by consumers by a simple trigger spray or simply by sponging or wiping onto a target substrate.

In certain embodiments of the invention, a surfactant is present in an amount to reduce the surface tension of the composition to the extent that the composition is able to wet a target surface of a substrate. A surfactant is chosen that is compatible with the silicone silanes system in the carrier. Surfactants operative herein illustratively include various classes of wetting surfactants: anionic, such as linear alkylbenzene sulfontaes, alcohol sulfates, alcohol ether sulfates, alchol ethoxylated sulaftes, alpha olefin sulfonates, alpha-sulfomethyl ester; and nonionic, such as alcohol ethoxylates, alkyl phenol ethoxylates. It is appreciated that alkanolamides, and alkylglucosides are also operative herein as surfactants to promote substrate wetting and composition stability. Stability promotion being especially important with water based carriers. A surfactant, if present, in an inventive composition is present from 0.05 to 5 total weight percent.

In certain embodiments of the invention, various additives enhance a property of an inventive composition; the property illustratively including storage stability, film formation, film durability and cleaning properties. Additives are provided such as a dye to modify the color of an inventive composition, glitter particulate, a bitterant such as a denatonium benzoate, a light stabilizer, a defoamer, a corrosion inhibitor, fragrance, or combinations thereof. Each additive independently is typically in an inventive composition in an amount from 0 to 3 total weight percent, while in other specific embodiments, each is present from 0.01 to 0.5 total weight percent.

A defoaming agent is present in certain inventive embodiments in an amount present to inhibit surfactant foaminess, if desired, and allow for smooth formation of a hydrophobic film produced from an inventive composition. Defoamer agents operative herein illustratively include silicone-based defoamers; mineral oil-based defoamers, and mixtures of foam destroying polymers and hydrophobic solids such as polyureas, as are known to the art. Specific exemplary silicone-based defoamers illustratively include silica-filled polydimethyl siloxane and polyether-modified polysiloxanes.

An inventive composition is readily stored in glass; metal; or plastic containers made of plastics such as polyethylenes, polypropylenes, nylons, PVC, or PET; or aerosol cans; or soaked wipe substrate; woven and non-woven substrates; or sponges.

While it should be appreciated that there is virtually no limit as to the nature of a substrate to which an inventive composition is applied to as to form a protective film, with the proviso that the substrate is not dissolved or otherwise damaged through exposure to an inventive composition.

An inventive composition optionally includes a halocarbon or hydrocarbon propellant in instances when an aerosol delivery system of an inventive composition is desired. Aerosol propellants operative herein illustratively include difluoroethane, trifluoroethane; alkanes such as butane, pentane, isobutane; propane; ethers such as dimethyl ether and diethyl ether; nitrogen; carbon dioxide; and combinations thereof. The resultant formulation inclusive of a propellant is sealed within a conventional metal aerosol canister and applied by spray application as is conventional to the art.

Compositions according to the present inventions are provided in Table 1.

TABLE 1

Inventive Composition - (amounts in total weight percent exclusive of optional propellant)

| Ingredient | Typical | Preferred, if present |
|---|---|---|
| Adhesion promoter | 3-40 | 5-26 |
| Curable silicone silane | 5-80 | 30-70 |
| Curing agent | 0-5 | 0-2 |
| Surfactant | 0-5 | 0.05-5 |
| Additives | each 0-3 | 0.01-0.5 |
| Carrier | remainder | remainder |

An inventive composition is readily provided as a kit in the form of a bottle, wipe or aerosol canister. The bottle optionally equipped with a pump- or spray-trigger, a flip-top or a spout closure. With the provision of an optional wipe remove excess composition, along with instructions for doing so, an inventive kit is operational. The instructions providing details as how to prepare a substrate, apply the inventive composition, removal of excess from the substrate and the time and properties of the film so applied. The instructions can also provide details as to how the composition is re-applied after an applied film is worn.

The present invention is further detailed with respect to the following non-limiting examples that are provided to further illustrate the preparation of specific inventive compositions and certain attributes associated with the resulting films on substrates.

EXAMPLE 1

Figure 1A:
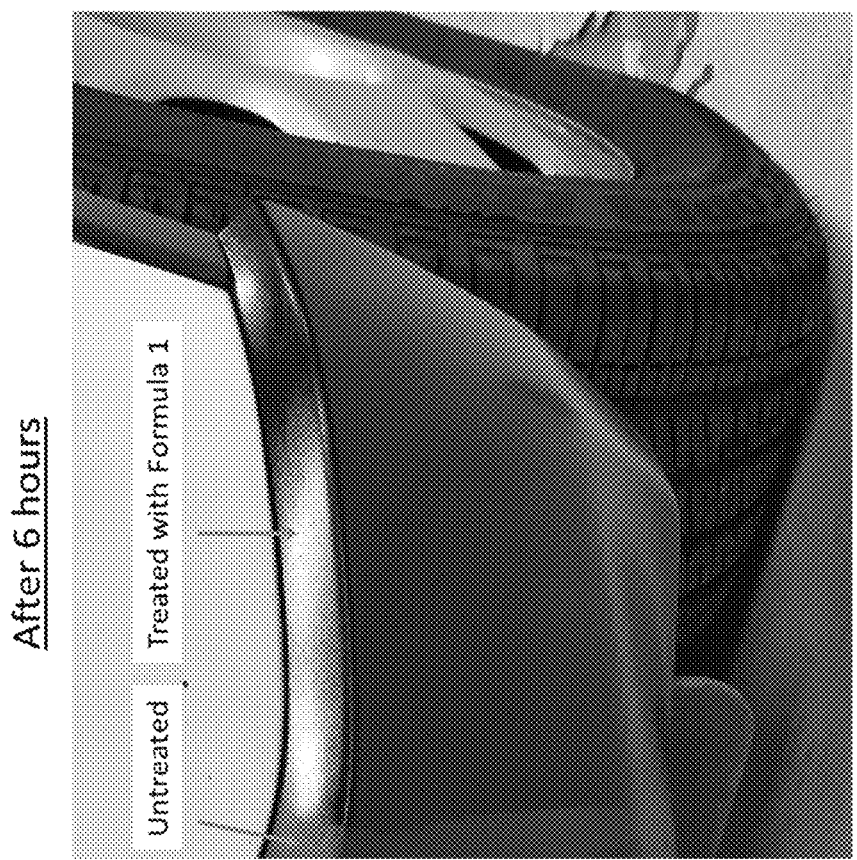

A composition of 30 total weight percent: D5 silicone oil, 50 total weight percent methoxy-terminated polysilsesquioxanes resin, and 20 total weight percent N-2-aminoethyl-3-aminopropyltrimethoxysilane is applied to a vehicle bumper cover trim at 20 degrees Celsius as the target substrate. The composition is applied with a wipe without a leveling issue. The shine of the resulting coating is evident from the untreated versus the treated area shown in FIG. 1A and FIG. 1B. FIG. 1A shows the bumper trim 6 hours after the coating is applied and cured. As shown in FIG. 1B the bumper trim has a strong shine even after 60 days after the coating is applied and cured.

EXAMPLE 2

The composition of Example 1 is sealed in a conventional metal aerosol canister with gaseous nitrogen as a propellant. The canister mixture is applied by spray application to the same substrates as Example 1 with excess liquid being removed from the substrate surface. The resulting film coated substrates are tested and perform in a similar manner as to those in Example 1.

EXAMPLE 3

A composition of Example 1 is modified by reducing the amount of N-2-aminoethyl-3-aminopropyltrimethoxysilane by 15 total weight percent to accommodate inclusion of 2 total weight percent of dibutyltindiacetate. The composition is applied per Example 1. The composition cured to form a shine coating in 30 minutes. The resulting coating behaved similar to that of Example 1.

Patents and publications mentioned in the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A restorative and protective composition that cures to yield a shine coating comprising:
   a curable silicone silane having silanol groups and selected from the group consisting of silicone MQ resins, and silicone MTQ resins, where M is (CH3) 3SiO, Q is SiO4, and T is (CH3) SiO3, with the proviso that at least one of M, Q, or T is modified to include a reactive terminal group of methoxy, ethoxy, dialkoyl, or trialkoxyl types;
   an adhesion promoter; and
   a carrier that is liquid at 20 degrees Celsius at atmospheric pressure in which said curable silicone silane and said adhesion promoter are dissolved, said carrier comprises a silicone oil, a hydrocarbon solvent, or combinations thereof.

2. The composition of claim 1 wherein said silicone silane is present from 5 to 80 total weight percent.

3. The composition of claim 1 wherein said silicone oil includes at least one of decamethylpentasiloxane, hexamethylcyclotrisiloxane, octamethylcyclo-tetrasiloxane, or oligiomeric forms that viscosities of from 2 to 10,000 centistokes (cSt).

4. The composition of claim 1 wherein said adhesion promoter is present from 3 to 40 total weight percent.

5. The composition of claim 1 wherein said adhesion promoter is present in an amount that increases a cure rate of said curable silicone silane.

6. The composition of claim 1 further comprising a catalyst.

7. The composition of claim 1 further comprising at least one additive of a dye, a glitter particulate, a bitterant, a light stabilizers, a defoamer, a corrosion inhibitors, or combinations thereof.

8. A process for applying a restorative and protective coating to a target substrate comprising:
applying the composition of claim 1 to the target substrate; and
allowing sufficient time for composition to cure onto the target substrate.

9. The process of claim 8 wherein applying is with a spray or a soaked wipe.

10. The process of claim 8 wherein applying is with an aerosol propellant.

11. The process of claim 8 wherein the target substrate is vehicle trim.

12. The process of claim 8 wherein the target substrate is a vehicle tire.

13. An article comprising:
a vehicle trim piece or a vehicle tire; and
a coating resulting from the cure of a composition of claim 1 adhered to a surface of said vehicle exterior trim piece or said vehicle tire.

14. The article of claim 13 wherein the vehicle trim piece is a vehicle exterior trim piece.

15. The article of claim 13 wherein the vehicle trim piece is a vehicle interior trim piece of a dashboard.

16. The composition of claim 6 wherein said cure catalyst is stored separately.

17. The composition of claim 16 wherein said cure catalyst is at least one of:
tetraalkyl titanate, tetraalkyl zirconate, dibutyltindiacetate, dibutyltindilaurate, dibutyltin dioctoate, dibutyltin dimalate, dibutyltin diacetate, stannous octoate, tin octylate, tetrabutyl titanate, dioctyltindilaurate, tetraisopropyltitanate titanium n-butoxide, zinc acetate, zinc 2-ethylhexanoate, or combinations thereof.

* * * * *